United States Patent

Bauer et al.

Patent Number: 5,368,637
Date of Patent: Nov. 29, 1994

[54] WATER-INSOLUBLE SULPHUR DYES, THEIR PREPARATION AND USE

[75] Inventors: Wolfgang Bauer, Maintal; Willi Steckelberg, Hofheim/Ts; Josef Ritter, Bad Soden; Wilhelm Mauelshagen, Bad Camberg, all of Germany

[73] Assignee: Cassella AG, Frankfurt, Germany

[21] Appl. No.: 143,619

[22] Filed: Nov. 1, 1993

[30] Foreign Application Priority Data

Nov. 11, 1992 [DE] Germany ............ 4237985

[51] Int. Cl.$^5$ .................. C08K 5/46
[52] U.S. Cl. ............... 106/22 H; 106/20 R; 106/20 D; 106/493; 106/498; 106/506
[58] Field of Search ........ 106/20 R, 20 D, 22 H, 106/493, 498, 506

[56] References Cited

U.S. PATENT DOCUMENTS

| | | | |
|---|---|---|---|
| 4,343,653 | 8/1982 | Beach et al. | 106/22 R |
| 4,941,923 | 7/1990 | Sotogushi et al. | 106/498 |
| 5,053,078 | 10/1991 | Koike et al. | 106/22 R |
| 5,300,148 | 4/1994 | Domingo et al. | 106/498 |
| 5,304,244 | 4/1994 | Goldmann et al. | 106/498 |

FOREIGN PATENT DOCUMENTS

| | | |
|---|---|---|
| 0063208 | 10/1982 | European Pat. Off. |
| 0274216 | 7/1988 | European Pat. Off. |
| 0325172 | 7/1989 | European Pat. Off. |
| 2254856 | 10/1992 | United Kingdom |

*Primary Examiner*—Mark L. Bell
*Assistant Examiner*—Scott L. Hertzog
*Attorney, Agent, or Firm*—Connolly and Hutz

[57] ABSTRACT

The water-insoluble sulphur dyes of the general formula I

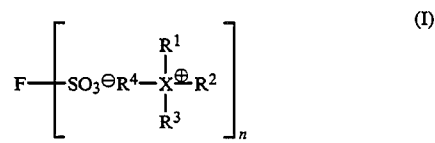

in which F is a dye chromophore of, for example, C.I. Sulphur Black 1 and $R^1$ to $R^4$ and n are as defined in Claim 1, are suitable in particular for producing recording fluids.

17 Claims, No Drawings

WATER-INSOLUBLE SULPHUR DYES, THEIR PREPARATION AND USE

The present invention relates to water-insoluble sulphur dyes, to a process for their preparation, to their use as colorants for writing inks and recording fluids, as charge-control agent for electrophotographic toners and as infrared absorbers, and to a recording fluid.

The present invention provides water-insoluble sulphur dyes of the general formula I

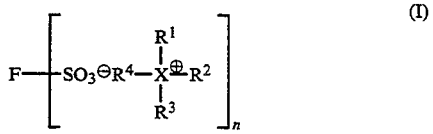

in which F is the dye chromophore of C.I. Sulphur Black 1, Sulphur Black 2, Sulphur Black 5, Sulphur Black 6, Sulphur Black 7, Sulphur Black 10, Sulphur Black 11 or Sulphur Black 12;

n is 1 to 6;

X is nitrogen or phosphorus;

$R^1$, $R^2$, $R^3$ and $R^4$, independently of one another, are hydrogen, with the restriction that not all are simultaneously hydrogen, $(C_1-C_{30})$-alkyl, $(C_1-C_{14})$-alkoxyethyl, $(C_1-C_{14})$-alkoxypropyl, oxyethyl of the general formula $(CH_3-CH_2-O)_m R^5$, $R^5$ being hydrogen or $(C_1-C_4)$-alkyl and m being 1 to 5, $(C_5-C_{12})$-cycloalkyl, phenyl or naphthyl each of which is unsubstituted or mono- or polysubstituted by $(C_1-C_{14})$-alkyl, $(C_1-C_{14})$-alkoxy $(C_1-C_{14})$-alkoxycarbonyl or halogen, $(C_6-C_{12})$-aryl-$(C_1-C_6)$-alkyl, it being possible for the alkyl radicals mentioned to be additionally substituted by hydroxyl, $(C_1-C_4)$-alkoxy or primary, secondary or tertiary amino groups and for the radicals $R^1$ and $R^2$ together the X to form a 5- or 6-membered ring system which is substituted or unsubstituted or contains further heteroatoms. Alkyl groups as $R^1$ to $R^4$ can be straight-chain or branched. They preferably have 1 to 22 carbon atoms. Particular preference is given to methyl, ethyl, propyl, butyl, pentyl, hexyl, octyl, nonyl, decyl, dodecyl, tetradecyl and hexadecyl, it being possible for each of these radicals also to be present in branched form.

$(C_5-C_{12})$-cycloalkyl can be mononuclear or polynuclear and is preferably cyclopentyl or cyclohexyl. $(C_6-C_{12})$-aryl-$(C_1-C_6)$alkyl is preferably benzyl. Halogen is preferably fluorine, chlorine or bromine.

Ring systems formed from the radicals $R^1$ and $R^2$ together with X can be aliphatic or aromatic. They can contain oxygen, sulphur and/or nitrogen as their further heteroatoms. Preferred ring systems are the pyridine and the piperidine system.

Preferred primary, secondary or tertiary amino groups as substituents of the alkyl radicals $R^1$ to $R^4$ are N-mono($C_1-C_4$)-alkylamino and N,N-di($C_1-C_4$)-alkylamino.

The sulphur dyes according to the invention of the general formula I can contain either uniform or mixed cations of the type mentioned.

F preferably represents the dye chromophore of C.I. Sulphur Black 1 or Sulphur Black 11.

The dyes according to the invention of the general formula I can be prepared by reacting soluble sulphur dyes of the general formula II

in which F and n are defined as stated above and $M^\oplus$ represents an alkali metal cation, preferably $Na^\oplus$, with an oxidizing agent to give dyes of the general formula III

and reacting these dyes with one or more salts of the general formula IV

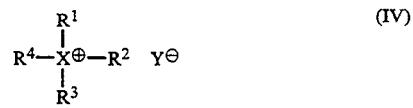

in which X and $R^1$ to $R^4$ are defined as stated above and $Y^\ominus$ is the anion of a weak or strong acid.

$Y^\ominus$ is preferably chloride.

Alternatively, sulphur dyes in the pigment or leuco form can also be converted into the sulphonated sulphur dyes of the general formula III by reaction with oxidizing agents (see, for example, Rev. Pure Appl. Chem. 12, 72 (1962)).

The oxidation of sulphur dyes in the form of the Bunte salts of the general formula II (solubilized sulphur dyes) or of sulphur dyes in the pigment or leuco form can be carried out, for example, with the following oxidizing agents: chlorine, bromine, iodine, sodium hypochlorite, sodium chlorite, sodium bromate, nitric acid, hydrogen peroxide, sodium perborate (see, for example, K. Venkataraman, "The Chemistry of Synthetic Dyes", Vol VII, p. 35 (1974); Rev. Pure Appl. Chem. 12, 72 (1962); EP 63,208).

In this reaction, it may be advantageous to activate the oxidizing agents used by metal ions. Examples of suitable metallic compounds are: $FeCl_2$, $FeCl_3$, $FeSO_4$, $Fe_2(SO_4)_3$, $K_3Fe(CN)_6$, $K_2Fe(CN)_6$, $CuCl_2$, $CuSO_4$, $Na_3VO_4$, $V_2O_5$, $Na_2WO_4$, $Na_2MoO_4$, $OsO_4$ and $SeO_2$.

Preferred oxidizing agents in the preparation of the dyes according to the invention of the general formula I are hydrogen peroxide, sodium perborate and sodium chlorite, which are used in particular in aqueous medium at a pH of 7 to 14 and temperatures of 20° to 150° C.

Particular preference is given to oxidation with $H_2O_2$ in aqueous medium.

The soluble sulphur dyes of the general formula II are known. C.I. Solubilized Sulphur Black 1 can be prepared, for example, by alkali fusion of 2,4-dinitrochlorobenzene to give 2,4-dinitrophenolate, reaction with sodium polysulphide at elevated temperature, followed by reaction with sulphur dioxide, sodium bisulphite or sodium sulphite (see, for example, Colour Index, Third Edition, Volume 4 (1972), p. 4476, 4485 and the references cited there; K. Venkatarman, "The Chemistry of Synthetic Dyes", Vol. VII, p. 1, p. 35 (1974); H. E. Fierz-David and L. Blangey, "Grundlegende Operationen der Farbenchemie", 8th Edition, p. 329, Springer Verlag, 1952).

The sulphur dyes of the C.I. Solubilized Sulphur Black 1 type are a mixture of dyes for which structures V and VI (K. Venkataraman, "The Chemistry of Synthetic Dyes", Volume II, p. 1090 (1952)) and VII (F. Gordon and P. Gregory, "Organic Chemistry in Color", p. 16, Springer Verlag 1983) have been proposed.

This procedure is the preferred variant of the process according to the invention. Alternatively, it is also possible to isolate the dyes according to the invention of the general formula I from the initially obtained aqueous solutions of the oxidation products of the general

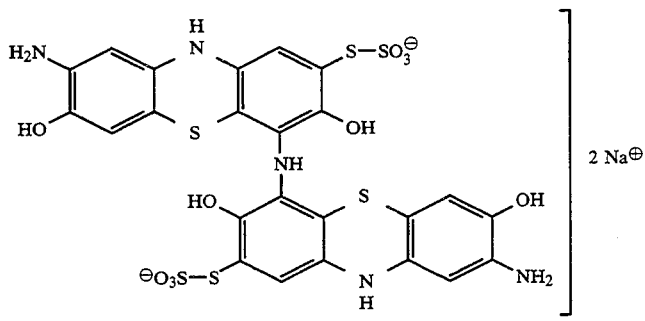

(V)

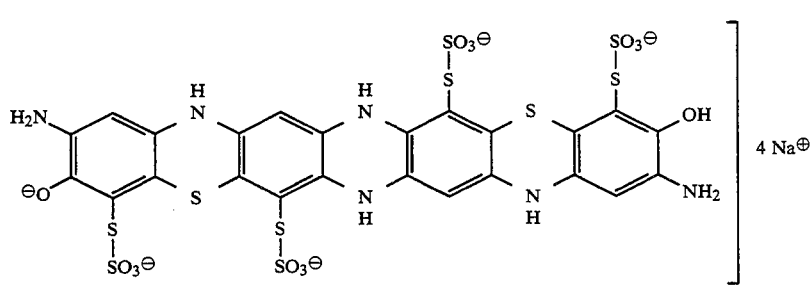

(VI)

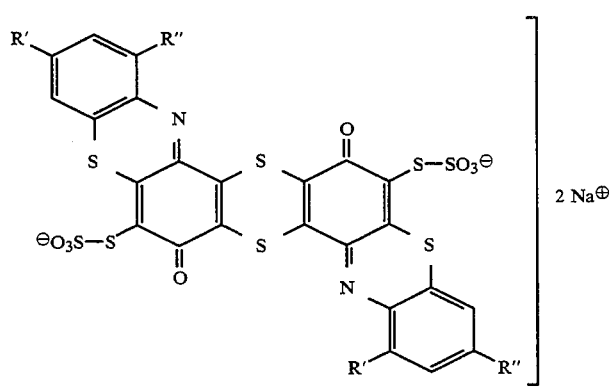

(VII)

(R', R'' = OH, NH₂)

The amount used of oxidizing agent can be varied within wide limits, for example from 2 mol to 8 mol of hydrogen peroxide per mole of 2,4-dinitrochlorobenzene used or 1 mol to 4 mol of sodium chlorite per mole of 2,4-dinitrochlorobenzene used. The oxidation products of the general formula III are usually obtained as sodium salts in aqueous solution which additionally contain salts such as sodium chloride, sodium sulphate, sodium sulphite or sodium thiosulphate resulting from the preparation. To convert them into the water-insoluble sulphur dyes according to the invention of the general formula I, the solutions obtained after oxidation are reacted with ammonium salts or phosphonium salts of the general formula IV. These reactions usually take place in an aqueous reaction medium at a pH of 2 to 8, preferably 4 to 7, and temperatures 0° to 100° C. preferably 10° to 50° C. The water-insoluble sulphur dyes of the general formula I obtained as an aqueous suspension are then isolated in the usual manner.

formula III in the form of the dye acid of the general formula IIIa

  (IIIa)

by adjusting the pH values of 0 to 2. This pH adjustment is carried out in the usual manner by means of a mineral acid, such as hydrochloric acid, sulphuric acid or phosphoric acid.

Dyes according to the invention of the general formula I where $R^4$ is hydrogen and X is nitrogen can then be obtained by subsequent neutralization of the dye acids of the general formula IIIa with amines of the general formula VIII

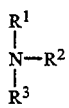

in which $R^1$ to $R^3$ are defined as stated above.

Examples of suitable amines of the general formula VIII which can be used as described above for preparing the dyes according to the invention of the general formula I in protonated form or in the form of the free base are: n-hexylamine, heptylamine, isoheptylamine, n-octylamine, isooctylamine, tert.-octylamine, 2-ethylhexylamine, 2,4,4-trimethyl-2-pentylamine, 1,5-dimethylhexylamine, 1-methylheptylamine, nonylamine, isononylamine, 3,5,5-trimethylhexylamine, decylamine, dodecylamine, hexadecylamine, stearylamine, coconut fatty amine, oleylamine, 2-ethylhexoxypropylamine, isononoxypropylamine, di-n-butylamine, di-2-ethylhexylamine, diisononylamine, distearylamine, dicyclohexylamine, diisopropylethylamine, tri-n-butylamine, triisooctylamine, dimethyl coconut fatty amine, dimethyldodecylamine, tribenzylamine, dodecylaminobisethanol, bis(hydroxyethyl) coconut fatty amine, bis(hydroxyethoxyethyl) coconut fatty amine, tris(3,6-dioxahepthyl)amine, 4-dodecylaniline, 2,5-dimethylaniline, 4-chloro-2,5-dimethylaniline, phenylbutylamine, 4-dodecylpyridine or 1-naphthylamine.

Examples of quaternary ammonium salts and phosphonium salts of the general formula IV which are suitable for preparing the water-insoluble sulphur dyes according to the invention of the general formula I are: tetrapropylammonium bromide, tetrabutylammonium bromide, benzyltributylammonium chloride, benzyltriethylammonium chloride, benzyldimethylhexadecylammonium chloride, 3-benzyl-5-(2-hydroxyethyl)-4-methylthiazolium chloride, hexadecylpyridinium chloride, methyltrioctylammonium chloride, methyltridecylammonium chloride, dimethyldioctylammonium chloride, dimethyldidecylammonium chloride, dimethyldihexadecylammonium chloride, trimethyldodecylammonium chloride, trimethylhexadecylammonium chloride, trimethyloctadecylammonium chloride, tetrabutylphosphonium acetate, tributylhexadecylphosphonium bromide, benzyldodecylbis(hydroxyethyl)ammonium chloride, tetraoctylammonium chloride.

The water-insoluble dyes according to the invention of the general formula I are suitable, for example, as colorants for solvent-containing inks, writing inks and recording fluids, in particular for the ink-jet printing method, and for the hot-melt printing method, as infrared absorbers, and as colorants and charge-control agents for electrophotographic toners.

The solubility of the water-insoluble sulphur dyes according to the invention of the general formula I in organic solvents depends on the chain lengths and degree of branching of substituents $R^1$ to $R^4$.

Dyes of the general formula I which are soluble in alcohols or methyl ethyl ketone are obtained with radicals $R^1$ to $R^4$ which have a total of 6 to 14 carbon atoms and are in particular branched. Such sulphur dyes according to the invention of the general formula I which are soluble in organic solvents exhibit excellent light fastness and water fastness and are highly suitable for producing inks for industrial ink-jet printing methods, for example for coding, marking and dressing.

The ink-jet printing method and the requirements of the inks and recording fluids used in this method are described, for example, in: Kirk-Othmer, Encyclopedia of Chemical Technology, 3rd Ed., Vol. 20 (1982), 153–156, and in Ullmann's Encyclopedia of Industrial Chemistry, 5th Ed., Vol. A 13 (1989), 588–594. Ullmann's loc. cit. 595 and Gregory: High Technology Application of Organic Colorants, Plenum Press (1991), 182, also described the requirements of hot-melt inks.

The inks and recording fluids for the ink-jet method preparable by means of the dyes according to the invention of the general formula I have an excellent shelf life even in concentrated form and excellent printing properties, in particular good response and ejection behaviour, good droplet formation and excellent image properties, in particular with respect to density, hue, contrast, water fastness, light fastness and weather fastness.

An ink for the ink-jet printing method consists of a solution of one or more dyes of the general formula I in a suitable organic solvent or solvent mixture, in particular in ethanol and/or methyl ethyl ketone. Examples of other solvents are methanol, propanol, isopropanol, butanol, sec.-butanol; amides, such as, for example, dimethylformamide and dimethylacetamide; ketones or ketone alcohols, such as, for example, acetone or diacetone alcohol; furthermore glycols and glycol ethers, such as, for example, ethylene glycol, diethylene glycol, triethylene glycol, diethylene glycol monoethyl ether.

Fatty acids and/or fatty acid esters and/or sulphonamides can also be used as non-volatile vehicles. The ink can also contain one or more other dyes and/or one or more auxiliaries, such as, for example, biocides, conducting salts or agents for adjusting the electric resistance, such as, for example, lithium chloride, sodium chloride, sodium sulphate, ammonium chloride, corrosion inhibitors, thickeners or agents for influencing the viscosity, and the like.

The amount of the dyes according to the invention of the general formula I in the ink or recording fluid depends on the desired optical density of the image. As a rule, the ink contains 0.5 to 20% by weight, preferably 0.5 to 15% by weight, of one or more sulphur dyes of the general formula I. The ink or recording fluid contains, for example, 99.5 to 80, preferably 99.5 to 85, % by weight of one or more organic solvents.

The inks or recording fluids can be prepared by dissolving a dye according to the invention of the general formula I in an organic solvent, preferably in ethanol and/or methyl ethyl ketone, or in a mixture of organic solvents and then, if desired, adding the other components, auxiliaries, and the like, followed by filtration.

EXAMPLE 1

1 l of water is added to 932 g of a solution of C.I. solubilized Sulphur Black 1 prepared in a known manner from 202.6 g of 2,4-dinitrochlorobenzene, and the resulting mixture is oxidized at 40° C. with 398 g of a 35% strength aqueous hydrogen peroxide solution. Stirring at 40° C. is then continued for 3 hours, during which the pH of the aqueous solution is maintained at 7–7.5 with 84 ml of 10 N sodium hydroxide solution. After the oxidation, the pH is brought to 5.8 with 30 ml of 5-molar sulphuric acid, and 650 ml of a 2-mol aqueous 2-ethylhexylammonium chloride solution is added to the dye solution at 25°–30° C. The dye suspension obtained is stirred at 30° C. for 1 hours, filtered, and the filter cake is washed with 3 l of water until free of electrolytes.

Yield: 416.6 g of black powder.

Absorption spectrum in ethanol: $\lambda_{max}=580$ nm.

The dye is highly suitable for producing inks for the ink-jet printing method using alcohols such as ethanol or isopropanol or methyl ethyl ketone to give prints having excellent light fastness and water fastness.

EXAMPLE 2

The oxidation described in Example 1 is carried out with 307.6 g, instead of 398.0 g, of a 35% strength aqueous hydrogen peroxide solution.

Yield: 408.2 g of black powder.

Absorption spectrum in ethanol: $\lambda_{max}=580$ nm.

EXAMPLE 3

The process described in Example 1 is repeated, using 498.3 g of 35% strength hydrogen peroxide instead of 398 g of 35% strength hydrogen peroxide.

Yield: 413.8 g of black powder.

Absorption spectrum in ethanol: $\lambda_{max}=580$ nm.

EXAMPLE 4

444.0 g of C.I. Solubilized Sulphur Black 1 in powdered form which was prepared in a known manner from 202.6 g of 2,4-dinitrochlorobenzene are dissolved in 3.0 l of water, and a solution of 45.2 g of sodium chlorite in 400 ml is water is added at 45° C. Stirring at 45° C. and a pH of 10.2 is continued for 4 hours, and 616 ml of a 2-molar aqueous 2-ethylhexylammonium chloride solution is then added to the mixture which has been brought to a pH of 5 with 10 N hydrochloric acid. The precipitated dye is then isolated and washed with water until free of salt.

Yield: 390.7 g of black powder.

Absorption spectrum in ethanol: $\lambda_{max}=580$ nm.

EXAMPLE 5

193.6 g of C.I. Sulphur Black 1, powder, which was prepared in the usual manner from 202.6 g of 2,4-dinitrochlorobenzene, are suspended in 1.4 l of water, and 291.6 g of a 35% strength aqueous hydrogen peroxide solution are added at 50° C., during which the pH is maintained at 7.5 to 9 by simultaneous addition of 182 ml of 10 N sodium hydroxide solution. Stirring at 70° C. is continued for 2 hours, and the black dye solution is first brought to a pH of 6 with 42 ml of 10 N hydrochloric acid. It is then cooled to 25° C., and 168 ml of a 2-molar aqueous 2-ethylhexylammonium chloride solution are added. Stirring at 25° C. is then continued for 2 hours, the resulting dye suspension is filtered, and the filter cake is washed with 3 l of water until free of salt.

Yield: 425.1 g of black powder.

Absorption spectrum in ethanol: $\lambda_{max}=580$ nm.

EXAMPLE 6

71 g of the dye obtained by Example 1 are introduced into 930 g of 96% pure ethanol and dissolved at 70°–75° C. Small amounts of an insoluble reside are filtered off to give 1000 g of a 7% strength black ink which has a long shelf life and is highly suitable for the ink-jet method. The black prints obtained exhibit excellent light fastness and water fastness.

Examples 7 to 30 below relate to further dyes according to the invention of the general formula I which can be obtained by the procedure of Example 1 from C.I. Solubilized Sulphur Black 1 and the respective compounds of the general formula IV.

| Example | Compound of the general formula IV |
|---|---|
| 7 | $(CH_3)_2CH-C_6H_{12}-\overset{\oplus}{N}H_3Cl^{\ominus}$ |
| 8 | $(CH_3)_2CH-C_6H_{12}-O-(CH_2)_3-\overset{\oplus}{N}H_3Cl^{\ominus}$ |
| 9 | $C_4H_9-CH(C_2H_5)-CH_2CH_2-O-(CH_2)_3-\overset{\oplus}{N}H_3Cl^{\ominus}$ |
| 10 | $(CH_3)_3C-CH_2-C(CH_3)_2-\overset{\oplus}{N}H_3Cl^{\ominus}$ |
| 11 | $(CH_3)_3-C-CH_2-CH(CH_3)-CH_2CH_2-\overset{\oplus}{N}H_3Cl^{\ominus}$ |
| 12 | $(CH_3)_2CH-(CH_2)_3-CH(CH_3)-\overset{\oplus}{N}H_3Cl^{\ominus}$ |
| 13 | $C_{12}H_{25}-\overset{\oplus}{N}H_3Cl^{\ominus}$ |
| 14 | $C_{12}H_{25}-\overset{\oplus}{N}H(CH_3)_2Cl^{\ominus}$ |
| 15 | $C_8H_{17}-\overset{\oplus}{N}H-(CH_2CH_2OH)_2Cl^{\ominus}$ |
| 16 | $C_{10}H_{21}\overset{\oplus}{N}H-(CH_2CH_2OH)_2Cl^{\ominus}$ |
| 17 | $C_{12}H_{25}-\overset{\oplus}{N}H-(CH_2CH_2CH)_2Cl^{\ominus}$ |
| 18 | $C_{14}H_{29}-\overset{\oplus}{N}H-(CH_2CH_2OH)_2Cl^{\ominus}$ |
| 19 | $C_{18}H_{37}-\overset{\oplus}{N}H-(CH_2CH_2OH)_2Cl^{\ominus}$ |
| 20 | $[C_6H_{11}]_2\overset{\oplus}{N}H_2Cl^{\ominus}$ |
| 21 | $\overset{\oplus}{H}N(C_4H_9)_3Cl^{\ominus}$ |
| 22 | $\overset{\oplus}{N}(C_4H_9)_4Cl^{\ominus}$ |
| 23 | $\overset{\oplus}{P}(C_4H_9)_4Cl^{\ominus}$ |
| 24 | $(C_4H_9)_3\overset{\oplus}{N}-CH_2-C_6H_5\,Cl^{\ominus}$ |

-continued

| Example | Compound of the general formula IV |
|---|---|
| 25 | 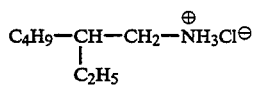 |
| 26 | $(C_{10}H_{21})_2\overset{\oplus}{N}(CH_3)_2 Cl^{\ominus}$ |
| 27 | $(C_{10}H_{21})_3\overset{\oplus}{N}-CH_3 Cl^{\ominus}$ |
| 28 | $C_{16}H_{33}\overset{\oplus}{N}(CH_3)_3 Cl^{\ominus}$ |
| 29 | $H_{25}C_{12}$—⬡—$\overset{\oplus}{N}H_3 Cl^{\ominus}$ |
| 30 | ⬡—$\overset{H}{\underset{H}{\overset{\oplus}{N}}}$—$C_4H_9$ |

Examples 31 to 34 below relate to further dyes according to the invention of the general formula I which can be obtained by the procedure of Example 1 from the dye given for the particular example and the compound of the formula $$C_4H_9-\underset{C_2H_5}{\overset{}{CH}}-CH_2-\overset{\oplus}{N}H_3 Cl^{\ominus}$$

| Examples | |
|---|---|
| 31 | C.I. Solubilized Sulphur Black 2 (C.I. 53196) |
| 32 | C.I. Solubilized Sulphur Black 5 (C.I. 53206) |
| 33 | C.I. Solubilized Sulphur Black 7 (C.I. 53301) |
| 34 | C.I. Solubilized Sulphur Black 11 (C.I. 53291) |

EXAMPLE 35

The procedure of Example 1 is repeated adding 2.0 g of sodium vanadate to the solution of C.I. Solubilized Sulphur Black 1 prior to the addition of the hydrogen peroxide solution.

Yield: 421.2 g of a black powder.

Absorption spectrum in ethanol: $\lambda_{max}=582$ nm.

EXAMPLE 36

The procedure of Example 1 is repeated, adding 3.0 g of sodium tungstate to the solution of C.I. Solubilized Sulphur Black 1 prior to the addition of the hydrogen peroxide solution.

Yield: 425.1 g of black powder.

Absorption spectrum in ethanol: $\lambda_{max}=582$ nm.

EXAMPLE 37

The procedure of Example 1 is repeated, using 498.3 g of a 35% strength hydrogen peroxide solution instead of 398 g of a 35% strength hydrogen peroxide solution and maintaining a reaction temperature of 90° C. instead of 40° C.

Yield: 414.1 g of black powder.

Absorption spectrum in ethanol: $\lambda_{max}=580$ nm.

EXAMPLE 38

The procedure of Example 1 is repeated, using 689.7 g of a 35% strength hydrogen peroxide solution instead of 398 g of a 35% strength hydrogen peroxide solution.

Yield: 419.1 g of black powder.

Absorption spectrum in ethanol: $\lambda_{max}=585$ nm.

We claim:

1. Water-insoluble sulphur dyes comprising the general formula I

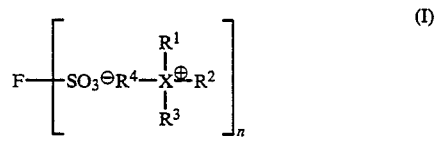

in which F is the dye chromophore of C.I. Sulphur Black 1, Sulphur Black 2, Sulphur Black 5, Sulphur Black 6, Sulphur Black 7, Sulphur Black 10, Sulphur Black 11 or Sulphur Black 12;

n is from about 1 to about 6;

X is nitrogen or phosphorus;

$R^1$, $R^2$, $R^3$ and $R^4$, independently of one another, are hydrogen, with the restriction that not all are simultaneously hydrogen; $(C_1-C_{30})$-alkyl; $(C_1-C_{14})$-alkoxyethyl; $(C_1-C_{14})$-alkoxypropyl; oxyethyl of the general formula $(CH_2-CH_2-O)_{32}R^5$, $R^5$ being hydrogen $(C_1-C_4)$-alkyl and m being 1 to 5; $(C_5-C_{12})$-cycloalkyl;

phenyl or naphthyl each of which is unsubstituted or mono- or polysubstituted by $(C_1-C_{14})$-alkyl, $(C_1-C_{14})$-alkoxy $(C_1-C_{14})$-alkoxycarbonyl or halogen;

$(C_6-C_{12})$-aryl-$(C_1-C_6)$-alkyl, it being possible for the radicals mentioned to be additionally substituted by hydroxyl, $(C_1-C_4)$-alkoxy or primary, secondary or tertiary amino groups and for the radicals $R^1$ and $R^2$ together with X to form a 5- or 6-membered ring system which is substituted or unsubstituted or contains further heteroatoms.

2. Water-insoluble sulphur dyes according to claim 1, wherein F represents the dye chromophore of C.I. Sulphur Black 1 or Sulphur Black 11.

3. Water-insoluble sulphur dyes according to claim 1, wherein $R^1$, $R^2$, $R^3$ and $R^4$ independently from one another are a straight-chain or branched alkyl having from 1 to 22 carbon atoms.

4. Water-insoluble sulphur dyes according to claim 1 wherein $R^1$, $R^2$, $R^3$, and $R^4$ independently from one another and are selected from the group consisting of methyl, ethyl, propyl, butyl, pentyl, hexyl, octyl, nonyl, decyl, dodecyl, tetradecyl, hexadecyl, cyclopentyl, cyclohexyl, benzyl, fluorine, chlorine and bromine.

5. Water-insoluble sulphur dyes according to claim 1 wherein $R^1$, $R^2$, $R^3$, and $R^4$ independently from one another and are selected from the group consisting of substituted or unsubstituted pyridine and substituted or unsubstituted piperidine.

6. Process for preparing water-insoluble sulphur dyes of claim 1 comprising reacting sulphur dyes of the general formula II

in which F and n are as defined in claim 1 and M represents an alkali metal cation, with an oxidizing agent to give dyes of the general formula III

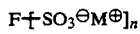 (III)

and reacting these dyes with one or more salts of the general formula IV

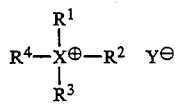 (IV)

in which X and $R^1$ to $R^4$ are defined as stated in claim 1 and $Y^\ominus$ is the anion of a weak or strong acid.

7. Process according to claim 6, wherein the sulphur dye is oxidized in its pigment or leuco form.

8. Process according to claim 6, wherein $M^\oplus$ is $Na^\oplus$ or $Y^\ominus$ is chlorine or both $M^\oplus$ is $Na^\oplus$ and $Y^\ominus$ is chlorine.

9. Process according to claim 6, wherein the oxidizing agent used is selected from the group consisting of hydrogen peroxide, sodium perborate, chlorine, bromine, iodine, sodium hypochlorite, sodium chlorite, sodium bromate and nitric acid.

10. Process according to claim 6 wherein the oxidation is carried out with hydrogen peroxide.

11. Process according to claim 6 wherein the oxidation is carried out in the presence of metal ions.

12. A recording fluid comprising a sulphur dye of claim 1, in an organic solution.

13. The recording fluid according to claim 12, wherein said recording fluid contains about 0.5 to about 20% by weight, of a sulphur dye of the general formula I.

14. The recording fluid according to claim 12, wherein said recording fluid contains about 0.5 to about 15% by weight, of a sulphur dye of the general formula I.

15. The recording fluid according to claim 12, wherein said recording fluid contains about 99.5 to about 80% by weight of an organic solvent or solvent mixture.

16. The recording fluid according to claim 13, wherein said recording fluid contains about 99.5 to about 85% by weight of an organic solvent or solvent mixture.

17. The recording fluid according to claim 12, wherein said recording fluid is an ink jet ink.

* * * * *